INTER-COMMUNICATION SYSTEM
Filed Sept. 13, 1954
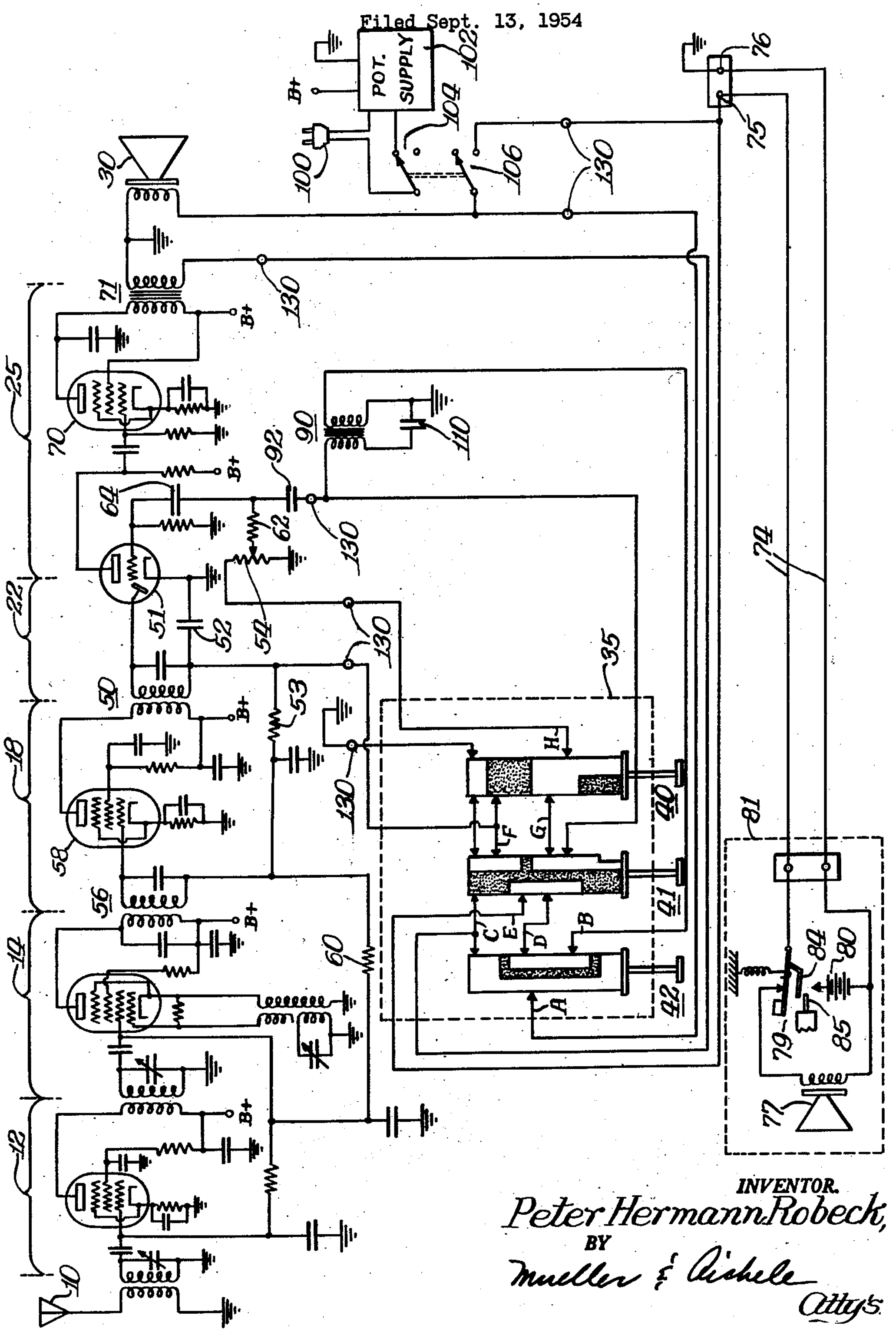
INVENTOR.
Peter Hermann Robeck,
BY
Mueller & Aichele
Attys.

2,814,672

INTER-COMMUNICATION SYSTEM

Peter Hermann Robeck, Elmwood Park, Ill., assignor to Motorola, Inc., Chicago, Ill., a corporation of Illinois Application September 13, 1954, Serial No. 455,400
6 Claims. (Cl. 179—1)

This invention relates generally to electrical inter-communication systems and more particularly to an improved communication circuit using a regular radio receiver as a master station in a two-way communications system.

Electrical inter-communication circuits find great utility in offices, restaurants, shops and the like where communication is desired between two or more persons separated beyond ordinary voice range. Such arrangements are frequently provided with apparatus for two way conversation as well as signalling or calling means so that one may be notified to answer a person at another station. Communication apparatus of this type is also useful in the home between rooms or floors or nearby buildings, but the necessary equipment and installation of the prior art arrangements has often proven to be too costly and elaborate for usual household use.

It is an object of the present invention to provide an inter-communication system having a base station and a remote station, with the base station incorporating a usual radio receiver with but few additional components including a simplified manually operated control system for conditioning the system to various desired operating modes.

Another object of the invention is to provide such an improved inter-communication system in which the remote station may call or signal the base station regardless of the operating condition of the base station, even if it is deenergized.

A feature of the invention is the provision in the base station of a series of mechanically and electrically coupled manually operated switch sections that condition the communication system into three modes; a first operating mode being the reproduction of radio signals at the base station, a second operating mode being the reproduction of radio signals at the base and remote stations, and a third operating mode being the conditioning of the system for two-way inter-communication.

Another feature of the invention is the provision of an improved and simplified calling or signalling circuit at the remote station which is connected directly to the speaker at the base station or through the amplifier thereof to provide a calling signal at the base station speaker regardless of the operating condition or setting of the controls thereof, or even when the base station is deenergized.

Further objects, features, and the attending advantages thereof will be apparent upon consideration of the following description when taken in conjunction with the accompanying drawing in which the figure is a schematic representation of a radio receiver incorporating the inter-communication apparatus of the present invention.

In practicing the invention there is provided an inter-communication system incorporated with a superheterodyne type radio receiver which functions as a master station. By closing a push-to-talk switch at the radio receiver and holding it closed, the speaker thereof is connected through a transformer to the input of the audio frequency system and the remote station is coupled through the two-wire communication line to the output transformer of the radio receiver so that a transmission may be heard at the remote position. When this push-to-talk switch is released, the remote speaker is coupled through the transformer to the audio frequency input of the radio receiver and the radio loudspeaker is coupled in conventional fashion to the output transformer of the audio system. The master station is then in a condition to listen to a transmission from the remote station. In either of the transmit and receive combinations, the second detector of the radio receiver is grounded to prevent interference by received radio signals. Operation of the switch may also couple the remote station as an additional speaker for the radio receiver, and further operation may permit the usual operation of the receiver alone.

When the receiver is in the normal receiving position, a vibratory switch at the remote station may be operated to apply a signal to the two-wire line and through the audio frequency system to be reproduced by the radio receiver as a calling signal. A network in the audio system provides application of the calling signal regardless of the setting of the volume control. If the remote station is functioning as a remote speaker for the radio receiver, operation of the vibratory switch applies a potential to the communication line which is directly connected to the loudspeaker in the radio receiver, as a call signal for this mode of operation. If the radio receiving apparatus is turned off, a switch incorporated with the radio power switch connects the master station speaker to the communication line so that signalling from the remote station may again be accomplished.

The figure shows a circuit which functions as a superheterodyne radio receiver in which signals are received by the antenna 10 and applied to the radio frequency amplifier 12 where a signal is selected and amplified, the amplified signal is then applied to the mixer-oscillator stage 14 where it is further selected and heterodyned with a signal from the oscillator portion to produce an intermediate frequency signal. This latter signal is then coupled to the intermediate frequency amplifier stage 18 where it is further selected and amplified after which it is demodulated in the detector circuit 22 and applied to the audio amplifier circuit 25 where it is amplified to be reproduced by the loudspeaker or transducer 30.

The switch means 35 is operative to connect the circuit as a radio receiver as briefly described above as well as to connect the receiver as part of an inter-communication system. This switch is illustrated here as a push button type having sections 40, 41, and 42. The mechanical construction of this switch is such that operation of section 40 releases switch section 41 if this section were previously operated and operation of switch section 41 releases switch section 40 if this were operated. Operation of switch section 42 releases either section 41 or section 40 if either of these were operated, and section 42 is not self-locking but must be held in its operated position. The shaded areas in the switch sections are composed of insulating material while the outline area indicates material of high electrical conductivity. Therefore, connections will be made as shown in the figure when each switch is not operated. The term "operated" when used with reference to these switch sections is intended to indicate that they are moved upward in the figure to change from the connections shown to connections as follows:

42 operated, AB and CD are connected;
41 operated, CE and FG are connected;
40 operated, FH are connected;

the remaining connections of any operated switch section being open.

Customary radio reception takes place when switch section 40 is moved to its operated position in which case the secondary of the intermediate frequency output transformer 50 is coupled between the diode plate in valve 51 of detector stage 22 and by way of a portion of switch section 40 to one side of volume control resistor 54. Automatic volume control filtering resistor 53 is also connected to one side of the secondary winding of transformer 50 while the other side of this resistor is coupled in conventional manner to the mixer-oscillator and radio frequency amplifier stages. Capacitor 52 provides radio frequency by-passing for the detector. The audio signal is developed across resistor 54 and a portion thereof is tapped off and applied through resistor 62 and coupling capacitor 64 to the control grid of a triode amplifier section in the valve 51. The audio signal is then applied to the electron valve 70 for final amplification after which it is coupled to output transformer 71 and to the reproducing device or transducer 30. One lead between the secondary winding of output transformer 71 and the voice coil of transducer 30 is connected to ground, and the other connection thereof is completed through a portion of switch section 42. It may be seen therefore that in this operated position of switch section 40 the apparatus will perform as a superheterodyne radio receiver with the received and detected signal reproduced in transducer 30.

A remote loudspeaker for the receiving apparatus may be provided in conjunction with the inter-communication equipment of the present invention. In order for the apparatus to function in this manner, switch section 41 is operated, and this releases switch section 40 if it were operated. A two-wire inter-communication line 74 is connected across the terminals 75, 76 and this line may consist of a two-wire cable or a single wire with an accompanying ground return. At the other end of the line is connected a transducer 77 through the switch means 79 which is normally in the closed position as shown. Transducer 77, which may be a permanent magnet loudspeaker or the like, together with switch means 79 and battery 80 form remote station 81.

Connection of the radio receiver will be similar to that utilized in the previously described circuit, but the connections to the remote station will be formed through switch section 41. One side of the secondary winding of transformer 50 is coupled through a portion of switch section 41 and a portion of switch section 40 to one side of resistor 54. A further connection is formed between terminal 75 and transducer 30 through a portion of switch section 41 and with the other side of transducer 30 connected to ground, as is terminal 76, the transducer 77 is in parallel with the transducer 30 through the communication line. Therefore, the two transducers will reproduce the sound which is developed in the receiving apparatus.

A call signal may be sent from remote station 81 when either switch section 41 or switch section 40 is in operated position. This signalling is accomplished by moving switch 79 to its downward position which completes a connection across the inter-communication line of battery 80 and vibrating arm 84. The arm 84 is set in vibration as it engages and passes the fixed member 85; therefore, a pulsating potential will appear across terminals 75 and 76 as arm 84 forms an interrupting connection with its contact. When switch section 40 is in its operated position, this pulsating potential will be applied across the primary winding of the transformer 90 through portions of switch sections 41 and 42. The secondary winding of transformer 90 is coupled through capacitors 92 and 64 to the control grid of the triode section of electron valve 51. The audio signal produced by a received radio program is tapped from resistor 54 and applied through resistor 62 to the audio amplifier. Resistor 62 is of small value so as not to seriously attenuate the radio signal but is, however of high enough value to prevent short circuit of a call signal applied through capacitor 92 when resistor 54 is set at low volume near the ground end. The capacitor 92 may be small, of the order of 22 micromicrofarads, so that the ordinary audio frequency signal will not be passed thereby but that some of the signal produced by vibrating arm 84 will be coupled into the audio system of the radio receiver to be reproduced in the transducer 30 as a series of clicks along with the received radio program. This then notifies a person listening to the radio receiver of a call from the remote station and setting of the radio volume control cannot prevent application of the calling signal.

When switch section 41 is operated, that is when the remote station 80 is operating as a second loudspeaker for the radio receiver, the terminals 75 and 76 are connected across the transducer 30 so that by operation of the switch 79 the audible call signal will be directly produced in the transducer 30. Therefore, a call signal may be transmitted with remote speaker operation.

The call signal may also be transmitted and received at the master station when the radio receiver is deenergized. Potential supply means or power plug 100 is connected to the potential supply 102 through the on-off switch 104. This switch has an additional ganged section 106 which establishes a connection between one side of the transducer 30 and terminal 75 when the switch 104 is open, i. e. when the receiver is off. Therefore, operation of switch 79 at the remote station 80 will permit application of the call signal from the remote station to the transducer 30 even when the receiving apparatus at the master station is not energized.

Listening at the master station to what is being transmitted from the remote station 80 is accomplished by operation and release of switch section 42. The operation of this switch section will release any of the other switch sections which were previously operated and will insure that one side of the secondary winding of transformer 50 is grounded through portions of switch sections 40 and 41 which prevents interference by a received radio signal. In this mode of operation sound waves striking the transducer 77 will induce a small voltage in the coil associated therewith which will appear across terminals 75 and 76 at the master station. This signal will then be applied through a portion of switch section 41 and a portion of switch section 42 across the primary winding of transformer 90. The secondary winding of this transformer is connected through portions of switch sections 40 and 41 to resistor 54 just as is detected audio during the normal operation of the receiver. The other side of the secondary winding is by-passed to ground through capacitor 110. Therefore a portion of a signal applied across terminals 75 and 76 may be tapped from the resistor 54 and applied to the grid of the electron valve 51 through resistor 62 and capacitor 64. A portion of switch section 42 connects transformer 71 and transducer 30 so that after amplification the signal will be reproduced in this transducer. One side of the secondary winding of transformer 50 is coupled to ground through a portion of switch section 41 and a portion of switch section 40 so that the receiving apparatus is effectively disabled thus preventing any interfering radio signal from entering the audio stage 25.

Transmitting from the master station is effected when switch section 42 is maintained in its operated position. In this position of switch section 42 it may be seen that the transducer 30 is connected across the primary winding of transformer 90 through a portion of switch section 42. And as previously, the secondary winding of this transformer in series with the capacitor 110 is connected across resistor 54. Therefore, audio signals developed by transducer 30 will be applied through resistor 62 and capacitor 64 to the triode section of electron valve 51. The secondary winding of transformer 71 is coupled across the terminals 75 and 76 through portions of switch sections 41 and 42 so that the output of the audio amplifier 75 may be applied to transducer 77 by way of inter-communication line 74. Merely by operation of switch section 42 then, the master station may transmit signals to the remote station 80 or receive the signals from that station.

The inter-communication apparatus of the present invention may be used in conjunction with a suitable radio receiver as an adapter therefore, or it may be constructed integral therewith so that only connection to terminals 75 and 76 is necessary in order to use the system. When the apparatus is used as an adapter it is possible to install resistor 62, capacitor 92 and switch 104, 106 within the radio receiver and to provide connecting means to couple the inter-communication apparatus to the receiver at connection points 130.

The apparatus provides an effective and simple two-way communication system between a remote station and a master station, the latter including a portion of a radio receiver with the remaining portion effectively disabled. A signalling or call system has also been provided for the remote station so that the call signal may be heard at the master station during any mode of operation of the radio receiver or even when this receiver is deenergized. Furthermore, the remote station may operate as an additional loudspeaker for the radio receiver to permit remote listening to signals received thereby. Any of the functions of the complete apparatus may be simply selected by the operation of a switch at the master station, but none of the controls at the master station may be set in such a manner that the calling signal from the remote station may not be heard. Since calling from the master is easily effected by operation of switch section 42, notification for two-way communication may always be given from either station and a very efficient system has been provided.

While a particular embodiment of the invention has been shown and described, it is understood that changes may be made and it is intended to cover all such changes and modifications as fall within the spirit and scope of the invention in the appended claims.

What is claimed is:

1. An inter-communication system including in combination, radio receiving apparatus including a detector, an audio amplifier and a first transducer; a second transducer to be positioned at a point remote from said radio receiving apparatus; an interconnecting circuit between said radio receiving apparatus and said second transducer; first switching means positioned adjacent said second transducer and having a first position for connecting said inter-connecting circuit to said second transducer and a second position for impressing a calling signal on said interconnecting circuit; second switching means adapted to be positioned with said radio receiving apparatus; respective connections extending to said second switching means from said detector, said audio amplifier, said first transducer and said interconnecting circuit; said second switching means having a first position in which said detector is coupled to said first transducer through said audio amplifier, a second position in which said detector is coupled through said audio amplifier to said first transducer and to said interconnecting circuit, a third position in which said interconnecting circuit is coupled through said audio amplifier to said first transducer, and a fourth position in which said first transducer is coupled through said audio amplifier to said interconnecting circuit; and impedance means having comparatively low impedance for calling signals and comparatively high impedance for detected radio signals and being coupled from said second switching means to said audio amplifier to impress said calling signal from said interconnecting circuit on said audio amplifier when said second switching means is in said first position.

2. The inter-communication system of claim 1 wherein said first switching means includes a vibratory portion and associated contact, operative in intermittent engagement in said second position thereof, and potential supply means coupled to said first switching means so that said calling signal comprises a pulsating potential.

3. An inter-communication base station for communicating over a connector line with a remote station including a remote transducer and a remote switch to couple the remote transducer and a calling signal to the line, said base station including in combination, radio receiving apparatus including a detector, an audio amplifier, a transducer and a ground point; terminal means for coupling to the connector line; switch means positioned with said radio receiving apparatus; respective connections extending to said switch means from said detector, said audio amplifier, said transducer, said ground point, and said terminal means; said switch means having a first position in which said detector is coupled through said audio amplifier to said transducer, a second position in which said detector is coupled through said audio amplifier to said transducer and to said terminal means, a third position in which said terminal means is coupled through said audio amplifier to said transducer said detector is connected to said ground point thereby disabling the same, and a fourth position in which said transducer is coupled through said audio amplifier to said terminal means and said detector is connected to said ground point thereby disabling the same; and a network including capacitor means having comparatively low impedance for calling signals and comparatively high impedance for detected radio signals, said network being coupled from said terminal means to said audio amplifier to impress a calling signal from said terminal means on said audio amplifier when said switch means is in said first position.

4. The inter-communication base station of claim 3 wherein the radio receiving apparatus includes potential supply means and a switching device with a first section coupled between said potential supply means and said radio receiving apparatus to energize and deenergize the same, and a second section coupled between said transducer and said connector means to electrically connect the same when said receiving apparatus is deenergized so that the calling signal may be reproduced in said transducer.

5. An inter-communication base station for communicating over a connector line with a remote station including a remote transducer and a remote switch to couple the remote transducer and a calling signal to the line, said base station including in combination, radio receiving apparatus including a detector, a transducer, an audio amplifier, and an input network including a variable resistor and a fixed resistor providing a circuit from said variable resistor to said audio amplifier; connector means for coupling said base stations to the connector line; switch means for said radio receiving apparatus; respective circuit means connecting said detector, said audio amplifier, said transducer and said input network to said switch means; said switch means having a first position in which said detector is coupled through said input network and said audio amplifier to said transducer, a second position in which said connector means is coupled through said input network and said audio amplifier to said transducer and a third position in which said transducer is coupled through said input means and said audio amplifier to said connector means; and a further network including capacitor means having comparatively high impedance to signals from said detector and comparatively low impedance to calling signals, said capacitor means being coupled from said connector means to said audio amplifier and said fixed resistor to impress a calling signal from said connector means on said audio amplifier when said switch means is in said first position, with said fixed resistor serving to isolate at least partially a calling signal from said variable resistor.

6. In an inter-communication system utilizing a radio receiver with an audio amplifier for inter-communication with a remote station adapted to produce a calling signal, said system including in combination, a first resistor, a second resistor, circuit means applying received and demodulated radio signals across said second resistor, said second resistor including an adjustable arm coupled through said first resistor to said audio frequency amplifier to apply radio signals thereto appearing across a portion of said second resistor, further circuit means adapted to be coupled to the remote station and including a capacitor having comparatively low impedance for calling signals and comparatively high impedance for demodulated radio signals, said capacitor coupling said further circuit means across said first resistor and said portion of said second resistor so that received radio signals and calling signals are applied to said audio frequency amplifier in proportional amounts at various settings of said adjustable arm of said second resistor with at least some calling signal being applied to said audio frequency amplifier at all settings of said adjustable arm due to isolating action of said first resistor.

References Cited in the file of this patent

UNITED STATES PATENTS

| | | |
|---|---|---|
| 2,138,598 | Goldsmith | Nov. 29, 1938 |
| 2,186,500 | Schnell | Jan. 9, 1940 |
| 2,496,398 | Lambert | Feb. 7, 1950 |